US005795512A

United States Patent [19]

Greener et al.

[11] Patent Number: 5,795,512

[45] Date of Patent: Aug. 18, 1998

[54] METHOD AND APPARATUS FOR REDUCING CURL IN WOUND ROLLS OF PHOTOGRAPHIC FILM

[75] Inventors: Jehuda Greener; Kam C. Ng, both of Rochester, N.Y.

[73] Assignee: Eastman Kodak Company, Rochester, N.Y.

[21] Appl. No.: 697,746

[22] Filed: Aug. 29, 1996

[51] Int. Cl.$^6$ .................................................... B29C 53/18

[52] U.S. Cl. ......................... 264/40.6; 264/234; 264/235; 264/280; 264/285

[58] Field of Search .................................... 264/234, 235, 264/280, 285, 342 RE, 342 R, 40.6

[56] References Cited

U.S. PATENT DOCUMENTS

| | | | |
|---|---|---|---|
| 3,806,574 | 4/1974 | Arvidson, Jr. | 264/160 |
| 3,916,022 | 10/1975 | Potter | 264/280 |
| 4,141,735 | 2/1979 | Schrader et al. | 96/75 |
| 4,808,363 | 2/1989 | Walsh et al. | 264/288.4 |
| 4,851,174 | 7/1989 | Lorsch | 264/235 |
| 4,994,214 | 2/1991 | Stevens et al. | 264/25 |
| 5,254,445 | 10/1993 | Takamuki et al. | 430/501 |
| 5,549,864 | 8/1996 | Greene et al. | 264/280 |
| 5,585,229 | 12/1996 | Kawamoto et al. | 264/234 |
| 5,629,141 | 5/1997 | Kawamoto | 264/234 |

OTHER PUBLICATIONS

J. Greener, A.H. Tsou, K.C. Ng, and W.A. Chen, *The Bending Recovery of Polymer Films*, May 23, 1990.

*Primary Examiner*—Jan H. Silbaugh
*Assistant Examiner*—Mark Eashoo
*Attorney, Agent, or Firm*—Mark G. Bocchetti

[57] ABSTRACT

A method for reducing curl in a stored photographic film which aids in preventing serious difficulties with downstream film transport and handling of the film. The film, which has been stored as a roll wound on a first core or mandrel is unwound from the first core and wound onto a second core or mandrel in a first direction. The film is then unwound from the second core to yield a traveling web portion. The traveling web portion is preheated to a predetermined temperature while being continuously delivered to a housing. The film is wound onto a third core or mandrel located within the housing in a direction opposite the first direction where it is maintained at about the same predetermined temperature.

17 Claims, 7 Drawing Sheets

METHOD AND APPARATUS FOR REDUCING CURL IN WOUND ROLLS OF PHOTOGRAPHIC FILM

BACKGROUND OF THE INVENTION

1. Field of the Invention

The present invention relates generally to the reduction of curl in rolled webs and, more particularly, to the reduction of curl in wound rolls of photographic film.

2. Brief Description of the Prior Art

When a photographic film web such as poly(ethylene terephthalate) or other polymeric film is stored for a long period of time in a wound configuration it develops core-set curl. The degree of core-set curl varies along the length of the web in the winding direction, usually with the highest core-set curl being imparted to that portion of the web nearest to the core upon which the web has been wound and the lowest core-set curl being on that portion of the web outermost from the core. The level of curl generally depends upon the storage time and the storage temperature as well as the core diameter and the physical properties of the web. The physical properties of the web include the material of the base web, its thickness and any coating which may have been applied thereto. In many applications in a variety of hardware systems and processes, excessive levels of curl can cause serious difficulties with film transport and handling. The core-set curl induced during film storage can be fully or partially offset by methods known in the prior art by rewinding the film in the reverse direction such that the section of the film near the core is placed near the core of the rewound roll of film and allowing the rewound roll to remain in such rewound configuration for period sufficient to offset the core-set curl. This, of course, requires a two-step rewinding process and further requires a storage of the roll for a period of time after the second rewinding step which is dependent upon the initial storage time of the roll prior to the implementation of the two-step rewinding process. Generally, the rewound roll will have to be stored for a period of time ranging from hours to days. U.S. Pat. No. 3,806,574 to Arvidson, Jr. teaches such a process for removing curl from stored rolls of film. The effects of the process are said to be accentuated when the rolled material is stored at temperatures above 25° C. and 75 percent relative humidity. Necessary hold times vary from 2 to 72 hours. This additional storage step requires a dedicated storage area and makes it impractical to integrate the decurling operation into a film production line or into a continuous photo finishing operation.

U.S. Pat. No. 4,141,735 to Schrader et al teaches a method for reducing core-set curling tendency of a polymeric film element stored in wound form. In the practice of such process, the thermoplastic polymeric film is provided in a substantially flat form or in the form of a roll of at least four inches inner diameter. The film is heated in an ambient relative humidity of less than 100 percent and a temperature in the range of from about 30° C. up to the glass transition temperature of the polymer. Heating is continued for about 0.1 to 1500 hours. Thus, the polymeric film is actually annealed and the practice of this process generally requires that annealing be performed for a long period of time.

U.S. Pat. No. 5,254,445 to Takamuki et al teaches a method for manufacturing a photographic film which has a reduced curling habit. The polyester-based film, after being coated with a silver halide emulsion layer and an antistatic layer is rolled around the core with its emulsion side facing outward. The film is then heated at a temperature not less than 30° C. for a period not less than 12 hours. After the heat treatment, the material is cut and rerolled on a commercial size core with its emulsion side facing inward.

U.S. Pat. No. 4,994,214 to Stevens et al purports to teach a process for making a biaxially oriented poly(ethylene terephthalate) photographic film having a controlled amount of curl in the longitudinal direction. This is accomplished by longitudinally stretching the film while the film is being asymmetrically heated across its thickness. The film is then wound into a stock roll. The stock roll, after this heat-tempering process, may be longitudinally slit, cut and rewound into smaller rolls in a winding direction opposite to the direction of the longitudinal curl induced in the film during the longitudinal asymmetrical heat-stretching period.

The prior art fails to teach a method for reducing curl in photographic film webs which can be performed in such relatively short times that the method could be used in an on-line, generally continuous mode of operation in conjunction with downstream processes. The prior art also fails to teach a method for reducing or removing curl from photographic film webs wherein a subsequent storage step after rewinding can be limited to zero to two hours.

SUMMARY OF THE INVENTION

It is, therefore, an object of the present invention to provide a method for removing curl from photographic film web which can be adapted for use in a continuous on-line decurling process.

A further object of the present invention is to provide a method for reducing or removing curl from photographic film webs where, upon completion of the necessary rewinding steps, decurling can be completed in a subsequent storage step ranging from about zero to no more than two hours.

Briefly stated, these and numerous other features, objects and advantages of the present invention will become readily apparent upon a reading of the detailed description, claims and the drawings set forth herein. These features, objects and advantages are accomplished by taking a stored roll of photographic film and first rewinding such roll in a first direction onto another core or mandrel. The roll is then rewound a second time in a direction opposite to the first direction onto a third core or mandrel. The third core or mandrel is stationed within a housing. The web while traveling from the second core or mandrel to the housing is preheated, preferably with a radiation heater, to a predetermined temperature which is from about 5° C. to about 50° C. above ambient storage temperature, and preferably from about 10° C. to about 40° C. above storage ambient temperature. The web is maintained at that predetermined temperature, or at about that predetermined temperature, within the housing such that in no more than 2 hours upon the completion of the second rewinding step, the film curl acquired by the roll during its storage period has been removed.

DETAILED DESCRIPTION OF THE PREFERRED EMBODIMENTS

Figure 1:
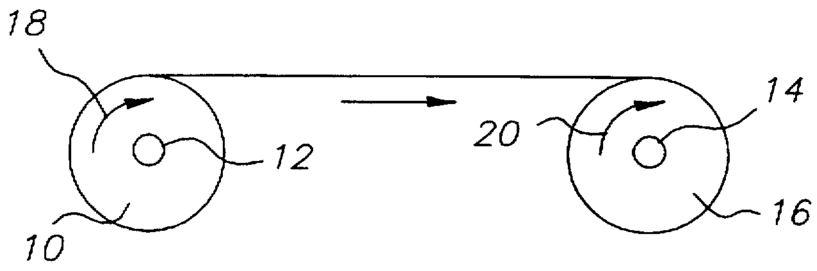
FIG. 1 is a schematic depicting the first rewinding step of the present invention.

Turning first to FIG. 1 there is shown a schematic illustrating the first rewinding step of the method of the present invention. A roll of photographic film web 10 which has been wound on a core or mandrel 12 of a winder (not shown) and kept in storage for a known period of time is rewound on a second core or mandrel 14 of a second winder (not shown). This yields a rewound roll 16. The direction of curl of roll 10 is indicated by arrow 18 and the direction of curl of rewound roll 16 is indicated by arrow 20. Note that the direction of curl for roll 10 is the same as the direction for roll 16. Photographic films are generally stored in climate controlled rooms at ambient temperatures in the range of from about 20° C. to about 25° C.

Figure 2:
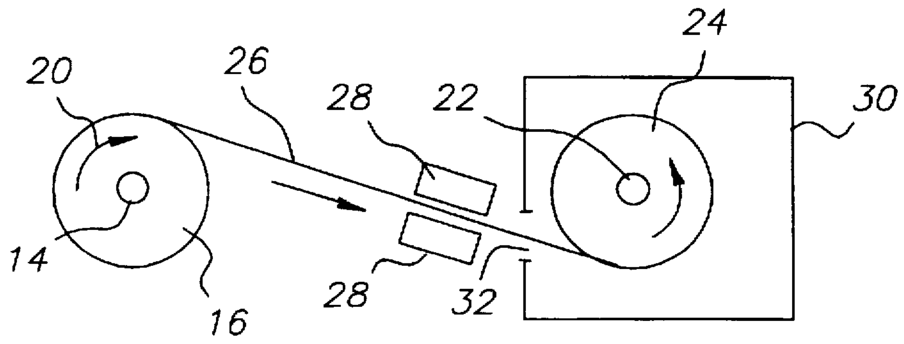
FIG. 2 is a schematic depicting the second rewinding step of the present invention.

Turning next to FIG. 2 there is shown a schematic drawing which illustrates the second rewinding step of the method of the present invention. In the practice of such step, rewound roll 16 is rewound a second time, this time onto a third core or mandrel 22. This yields a reverse rewound roll 24. During the practice of this second rewinding step, the traveling portion 26 of the web is preheated to a predetermined temperature with heater 28. Heater 28 is preferably a radiant-type heater. Core 22 is supported within a housing 30 having an opening 32 therein allowing for the passage of the traveling portion 26 of the web therethrough. Heating means (not shown) maintain the reverse rewound roll 24 within housing 30 at about the predetermined temperature and at a predetermined relative humidity during the second rewinding step and, if necessary, for a period of time after the completion of the second rewinding step.

Through the implementation of a preheating step as the second winding step is being performed in the practice of the method of the present invention, it is possible to substantially shorten the storage time of the roll in the rewound configuration. In fact, in the practice of the present invention, the storage time required after the completion of the second rewinding step will always be less than two hours. In fact, the entire storage time after the completion of the second winding step can be reduced to the duration of the rewinding step itself under standard production speeds. In other words, storage time upon completion of the second rewinding step can often be reduced to zero. This makes it possible to combine the decurling operation of the present invention with a film production line or with a continuous photo finishing operation.

The traveling portion 26 of the is preferably preheated to a predetermined temperature which is from about 5° C. to about 50° C. above ambient storage temperature and, most preferably from about 10° C. to about 40° C. above ambient storage temperature. The web is maintained at that predetermined, preheating temperature, or at about that predetermined temperature, within the housing such that in no more than 2 hours upon the completion of the second rewinding step, the film curl acquired by the roll during its storage period has been removed.

The method of the present invention can be evaluated by a model developed by the inventors to predict the core-set curl of photographic films following an arbitrary winding history. Data has been collected in order to verify the model. It was, however, the model which was used to generate the data set forth in the graphs presented herein. A general outline of the model used to generate the graphs and the examples depicted thereby is given below. A complete description of the model and definitions of the terms used therein, as well as the details of the mathematical approach for solving the corresponding equations is given in a paper entitled "The Bending Recovery of Polymer Films. I. A Phenomenological Model" which appeared in the Journal of Polymer Science: Part B: Polymer Physics, Vol. 29, 843–858 (1991), and is hereby incorporated herein by reference. The general terminology used will be familiar to those skilled in the art.

It is assumed that the material obeys the linear-viscoelastic constitutive law:

$$\sigma(t)=\int_{-\infty}^{t}E(t-\xi)\dot{\epsilon}(\xi)d\xi \quad (1)$$

where $\sigma$ is the axial tensile stress (stress acting along machine direction), t is the time of curl measurement, $\xi$ is a dummy time variable, $\epsilon$ is the axial strain (strain in machine direction) and $\dot{\epsilon}$ is the strain rate. E(t) is a material function known as the tensile relaxation modulus. This function is independent of strain and Eq. 1 generally holds in the limit of small strains (<1%) which is typical of many winding situations. The stress relaxation function can be represented empirically by:

$$E(t)=\sum_{i=1}^{n} E_i \exp(-t/\lambda_i) \quad (2)$$

where $E_i$ and $\lambda_i$ are material parameters obtained from a stress relaxation experiment.

The strain at a given position along the film is given by:

$$\epsilon(x, y)=\frac{y}{R(x)}=y \cdot \mathrm{curl}(x) \quad (3)$$

where y is the cross film position (y=0 at the neutral plane~midplane of film) and R(x) is the radius of curvature (inverse of curl) at position x along the wound film (x=0 at the core of the wound roll). When the film is wound, R(x) can be evaluated from the winding geometry of the roll. When the film is unwound the radius of curvature (1/curl) is estimated from Eq. 1. Since the axial stress vanishes at the instant when the film is unwound after the nth winding step ($t_{r,n}$) Eq. 1 can be written as:

$$\sigma(t \geqq t_{r,n})=0=\int_{-\infty}^{t} E(t-\xi)\epsilon(\xi)d\xi \quad (4)$$

This equation must be solved for the strain $\epsilon$ at time t, for a given strain history as specified by the particular winding sequence selected. Details of the solution are given in the above referenced article. The final strain (strain when curl is measured at time t) at position x is converted to curl by:

$$\mathrm{curl}(x, t)=\frac{\epsilon(x, y, t)}{y} \quad (5)$$

If one of the steps during the winding sequence is conducted at an elevated temperature T, the actual winding time spent on the core in this step ($\Delta t$) is replaced by an effective time interval given by:

$$\Delta t'=\frac{\Delta t}{a_T} \quad (6)$$

where $a_T$, the time-temperature shift factor, is represented by:

$$a_T=\exp\left[\Delta H\left(\frac{1}{T}-\frac{1}{T_r}\right)\right] \quad (7)$$

$\Delta H$ is a material parameter and $T_r$ is ambient (or reference) temperature. Thus, by raising the temperature at any particular winding step, the effective winding time is longer compared to the actual time for a positive value of $\Delta H$. Characteristic material parameters for PET film ($E_i$, $\lambda_i$ and $\Delta H$) are listed in Table 1.

TABLE 1

| i | $\lambda_i$ (sec)* | $E_i$* |
|---|---|---|
| 1 | 1.0E01 | 2.36E−2 |
| 2 | 1.0E02 | 2.49E−2 |
| 3 | 1.0E03 | 1.95E−2 |
| 4 | 1.0E04 | 7.19E−2 |
| 5 | 1.0E05 | 0.107 |
| 6 | 1.0E06 | 0.252 |
| 7 | 1.0E08 | 0.213 |
| 8 | 1.0E09 | 0.285 |

*at 25° C.
$\Delta H$ = 19000 (when T and $T_r$ in Eq. 7 expressed in °K.)

Using the model described above, the present invention is now illustrated by the

EXAMPLES 1

Figure 3:
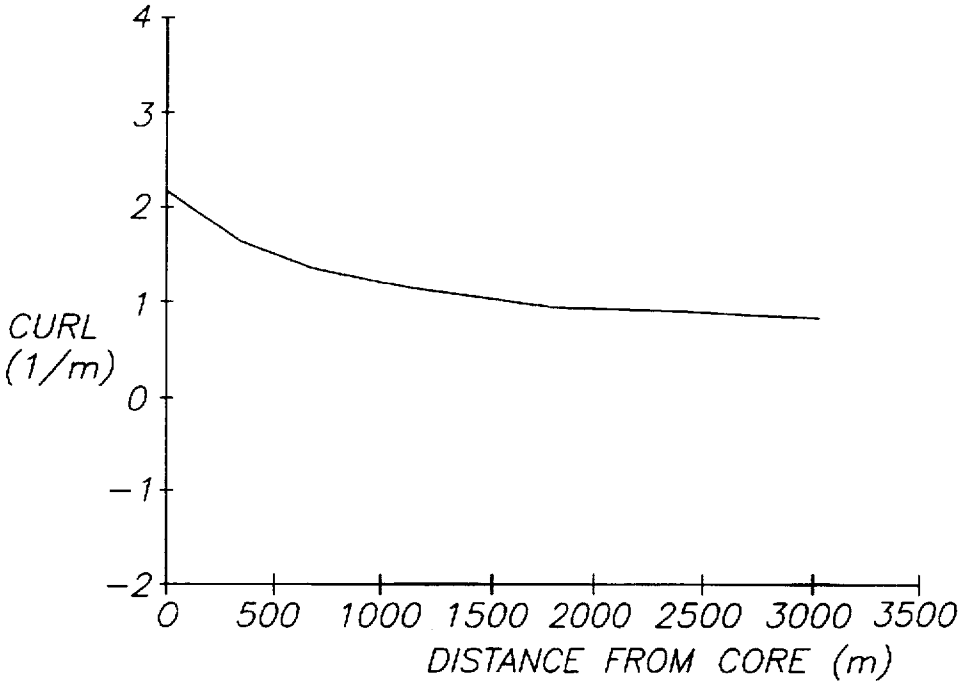
FIG. 3 is a graph showing the curl profile for the photographic film of Example 1 set forth herein plotting curl in inverse meters (1/m) versus distance (in meters) from the core.

A photographic film consisting of a poly(ethylene terephthalate) (PET) base and coated with suitable emulsions and other layers is stored for three (3) weeks under ambient conditions (21° C./50%RH) on a large roll. The total length of the stored film is 3050 m, its thickness is 0.178 mm and the core diameter of the roll is 0.152 m. The film is unwound from the storage roll, slit and cut into small sheets. The curl of the sheets is measured approximately 2 hours after unwinding at different positions along the unwound film yielding a curl profile as shown in FIG. 3. Example 1 is a base line example where operation has been performed which is designed to decurl the film. The general procedure for measuring curl is described in detail in U.S. Pat. No. 4,141,735.

EXAMPLE 2

Figure 4:
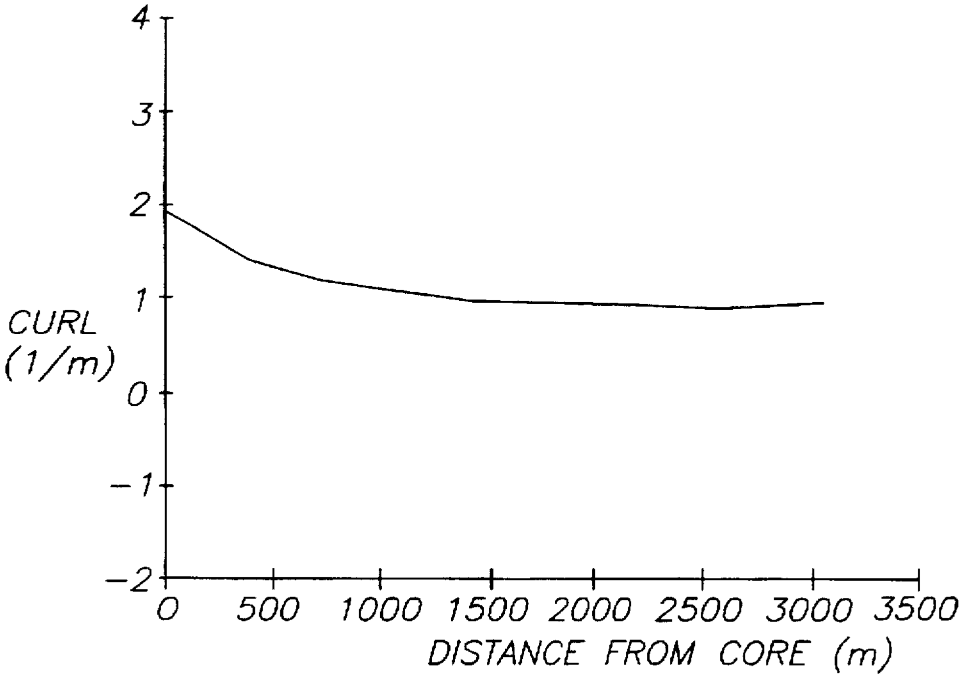
FIG. 4 is a graph showing the curl profile for the photographic film of Example 2 set forth herein plotting curl in inverse meters (1/m) versus distance (in meters) from the core.

The same photographic film as in Example 1, which has also been stored for three (3) weeks under ambient conditions (21° C./50%RH) on a large roll, is unwound from the storage roll and is reverse-wound according to the schematics in FIGS. 1 and 2 with the exceptions that the film is neither preheated with heaters 28 nor heated within housing 30. Cores or mandrels 14 and 22 in this Example 2 have the same diameter as core 12 (0.3 m) and the film is transported at a speed of 61 m/min during the two rewinding steps. The film is stored on core 22 for approximately 10 minutes and is then unwound, slit and cut into sheets. As in Example 1, the curl of the sheets is measured approximately 2 hours after unwinding at different positions along the unwound roll, yielding a curl profile shown in FIG. 4. The operations performed on the roll in Example 2 are generally consistent with the above-mentioned U.S. Pat. No. 4,141,735 to Arvidson, Jr. As can be seen from a comparison of the graphs of FIGS. 3 and 4, a very modest reduction in curl is achieved with the short storage time.

EXAMPLE 3

Figure 5:
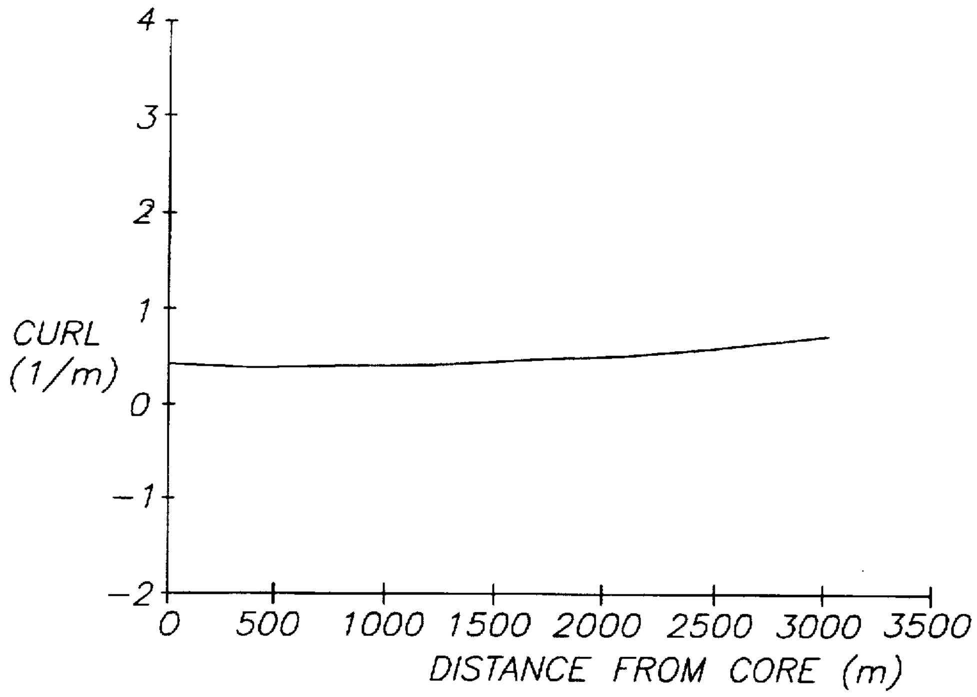
FIG. 5 is a graph showing the curl profile for the photographic film of Example 3 set forth herein plotting curl in inverse meters (1/m) versus distance (in meters) from the core.

The same photographic film as in Example 2 is again stored for three (3) weeks under ambient conditions (21° C./50%RH) on a large roll. As in Example 2, the photographic film undergoes the two step rewinding process. However, in this Example 3, the film is heated by radiant heaters 28 to a temperature of 37.5° C. (12.5° C. above the ambient temperature at which the film had been stored) prior to the second rewinding step, as shown in FIG. 2. The radiant heaters 28 are placed a short distance (approximately 1 m) from the second rewinder and the second rewinder is housed in a heated enclosure 30 which is maintained at a temperature which is identical to the temperature (37.5° C.) the film was preheated to with the radiant heaters 28. The rewound film is stored within heated enclosure 30 for a period of approximately 10 minutes after the completion of the second rewinding step. The corresponding curl profile Example 3 is shown in FIG. 5. Comparing FIG. 5 to FIG. 4, it can be seen that significant core-set curl reduction is achieved over a short period of time with the addition of the preheating step.

EXAMPLE 4

Figure 6:
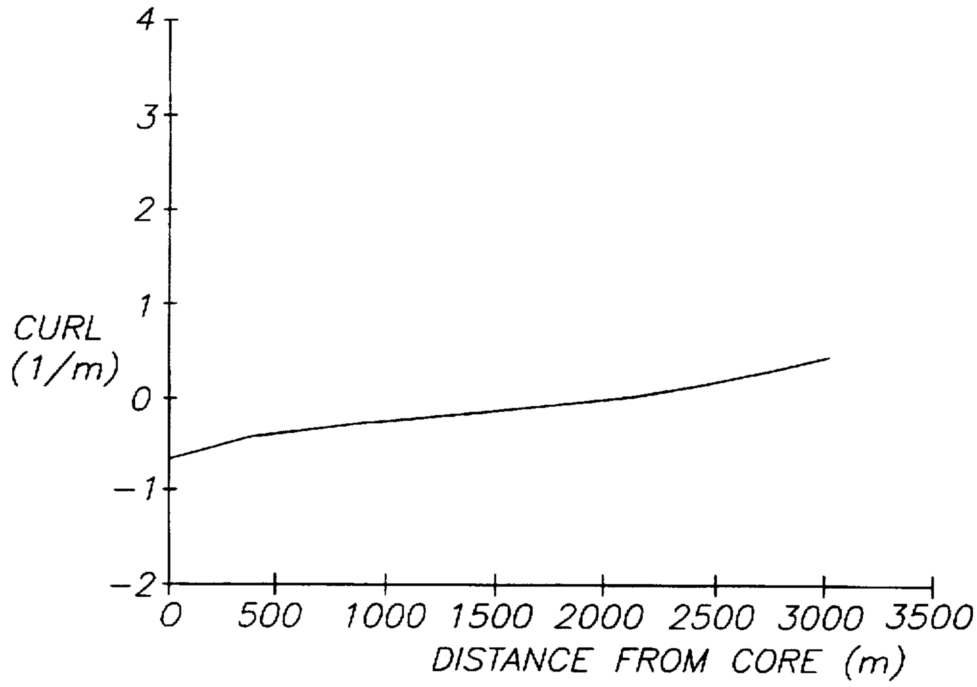
FIG. 6 is a graph showing the curl profile for the photographic film of Example 4 set forth herein plotting curl in inverse meters (1/m) versus distance (in meters) from the core.

The same photographic film as in Example 3 is again stored for three (3) weeks under ambient conditions (25° C./50%RH) on a large roll. As in Example 3, the photographic film undergoes the two step rewinding process and is heated by radiant heaters 28 to a temperature of 45.0° C. (20° C. above the ambient temperature at which the film had been stored) prior to the second rewinding step, as shown in FIG. 2. The rewound photographic film is maintained at a temperature of 45.0° C. within housing 30 and the film is again held within housing 30 for a period of approximately 10 minutes after the completion of the second rewinding step. The corresponding curl profile for the film of Example 4 is shown in FIG. 6. Comparing FIG. 6 to FIG. 5, it can be seen that even further core-set set curl reduction is achieved by preheating the traveling web portion 26 to a higher temperature.

EXAMPLE 5

Figure 7:
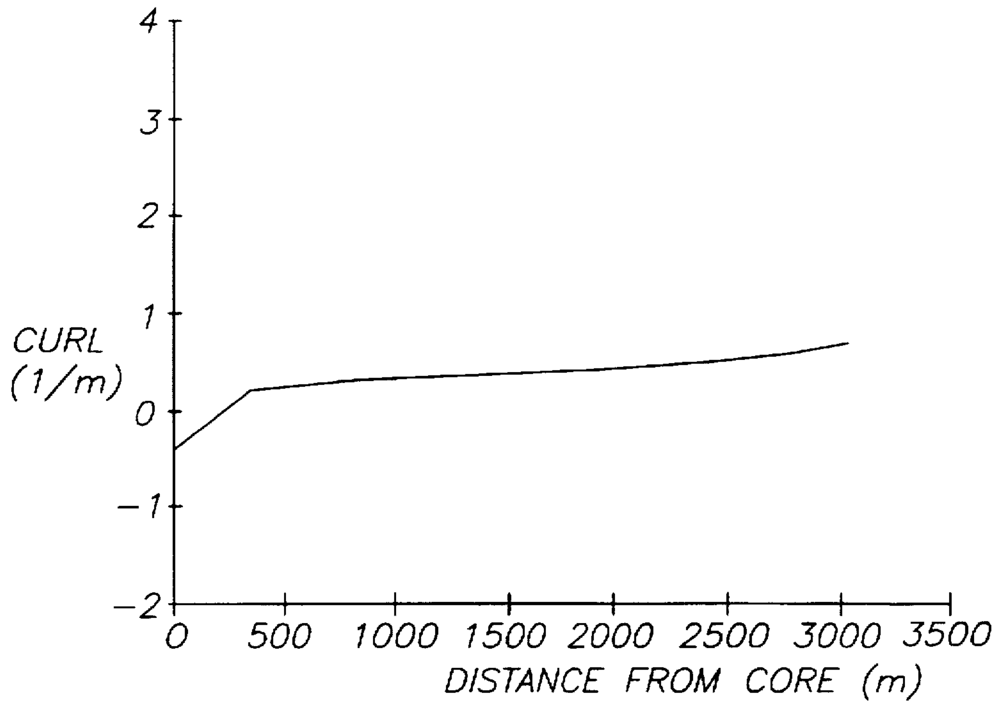
FIG. 7 is a graph showing the curl profile for the photographic film of Example 5 set forth herein plotting curl in inverse meters (1/m) versus distance (in meters) from the core.

All of the conditions and process steps of Example 3 are duplicated in this Example 5 with the exception that the diameter of core or mandrel 22 of the second rewinder is reduced to 0.152 m. The corresponding curl profile for the photographic film of Example 5 is shown in FIG. 7. Comparing FIG. 7 with FIG. 5, it can be seen that a decrease in the size of core or mandrel 22 also impacts the amount core-set curl reduction achieved, particularly with that portion of the film located nearer the core or mandrel.

EXAMPLE 6

Figure 8:
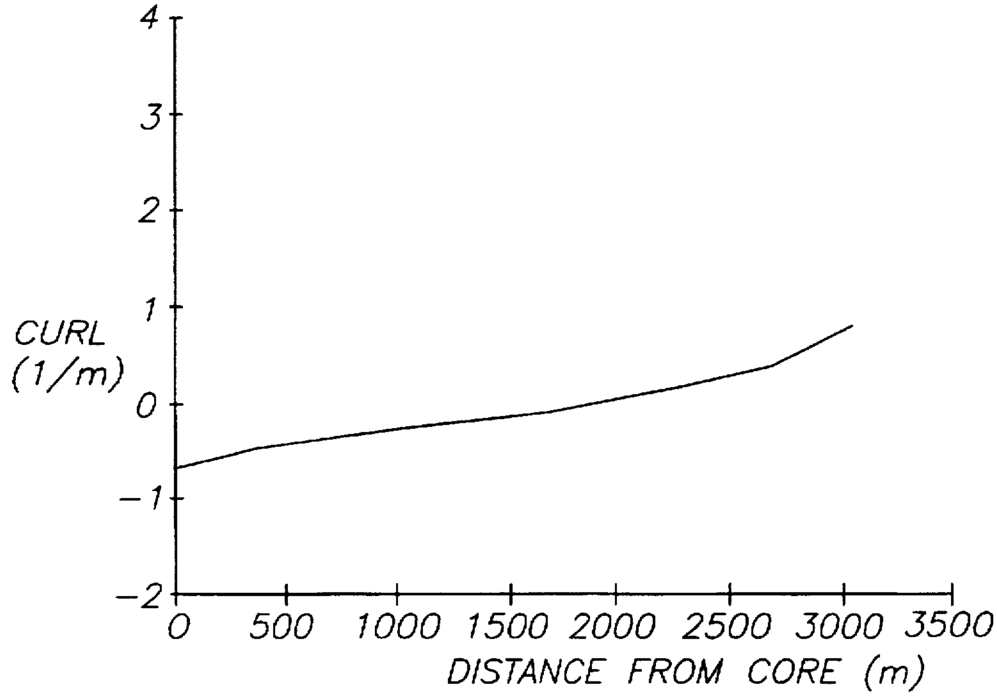
FIG. 8 is a graph showing the curl profile for the photographic film of Example 6 set forth herein plotting curl in inverse meters (1/m) versus distance (in meters) from the core.

All of the conditions and process steps of Example 4 are duplicated in this Example 6 with the exception that the storage time within housing 30 on the second rewinder (C) is reduced to 0 min. after the completion of the second rewinding step. In other words, the film is wound on the second rewinder at the specified speed and is unwound immediately thereafter. The corresponding curl profile for the photographic film of Example 6 is shown in FIG. 8. Significant core-set curl reduction is achieved with zero storage time after the completion of the second rewinding step.

EXAMPLE 7

Figure 9:
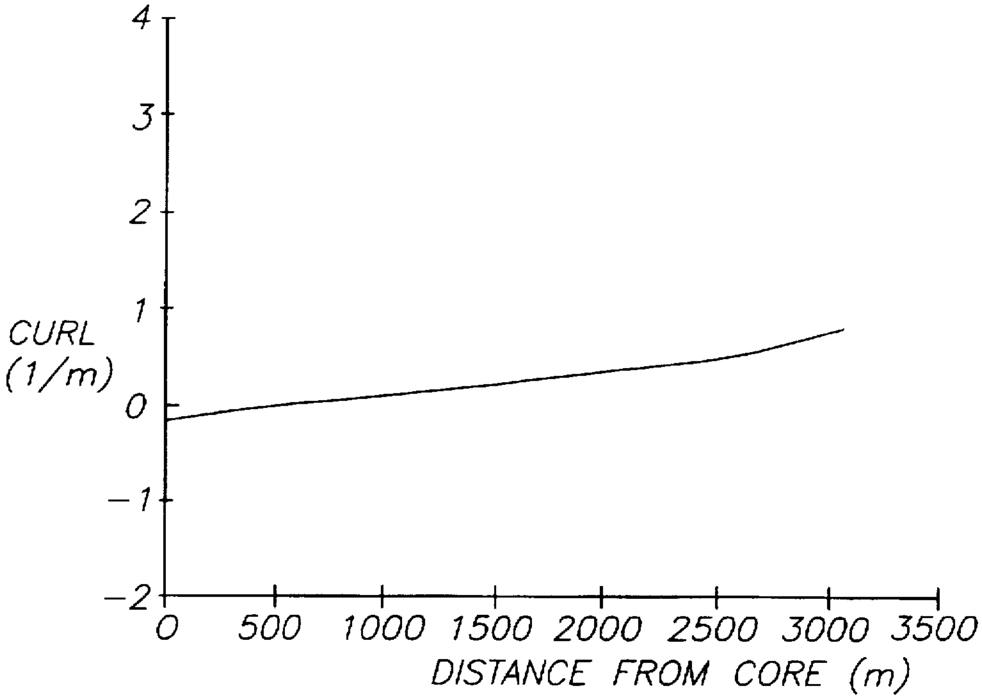
FIG. 9 is a graph showing the curl profile for the photographic film of Example 7 set forth herein plotting curl in inverse meters (1/m) versus distance (in meters) from the core.

All of the conditions and process steps of Example 3 are duplicated in this Example 7 with the exception that the transport speed of the film in the second rewinding step is reduced to 30.5 m/min. The corresponding curl profile for the photographic film of Example 7 is shown in FIG. 9.

EXAMPLE 8

Figure 10:
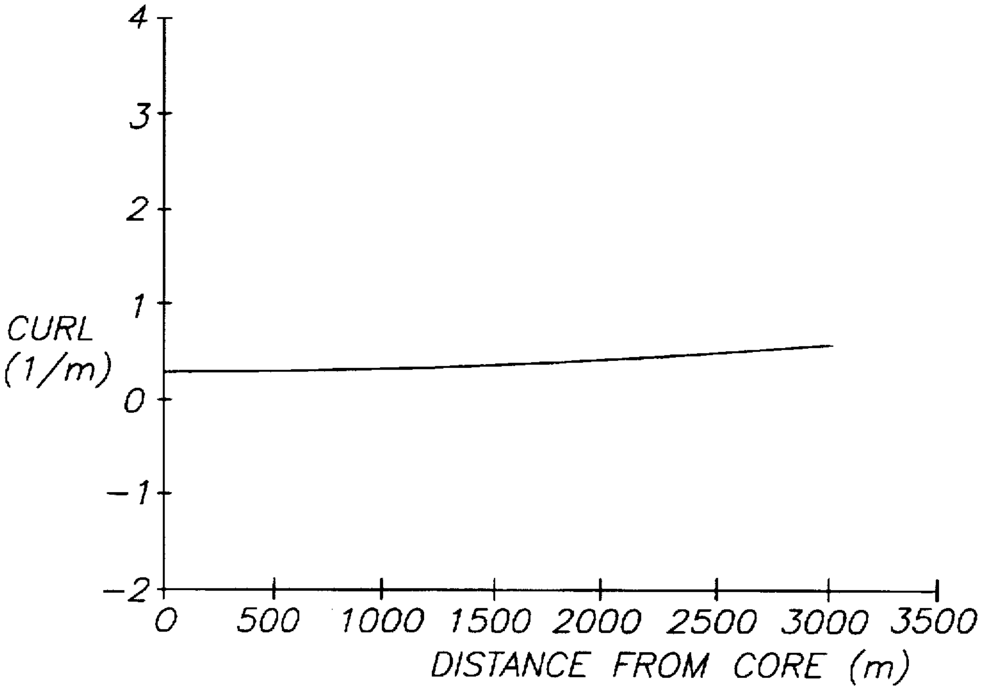
FIG. 10 is a graph showing the curl profile for the photographic film of Example 8 set forth herein plotting curl in inverse meters (1/m) versus distance (in meters) from the core.

All of the conditions and process steps of Example 3 are duplicated in this Example 8 with the exception that the storage time on the second rewinder (C) after the completion of the second rewinding step is increased to 30 minutes. The corresponding curl profile for the photographic film of Example 8 is shown in FIG. 10.

EXAMPLE 9

Figure 11:
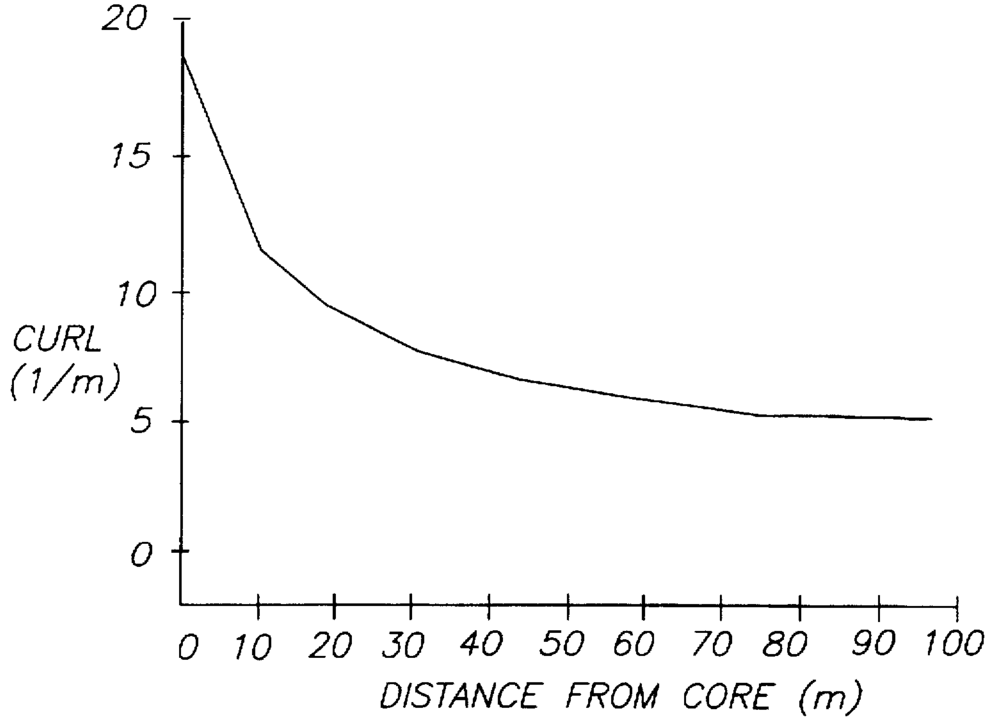
FIG. 11 is a graph showing the curl profile for the photographic film of Example 9 set forth herein plotting curl in inverse meters (1/m) versus distance (in meters) from the core.

Example 2 is duplicated with the following exceptions. The PET film of Example 9 is 91.4 m long and it is transported through the two rewinding steps at a speed of 30.5 m/min. The diameters of each of cores or mandrels 12, 14, 22 is 3.81 cm. The initial roll 10 is stored for four (4) weeks prior to decurling and the film is held on second rewinder within housing 30 for a period of 30 minutes after the completion of the second rewinding step prior to unwinding. Curl is determined along the film one (1) hour after unwinding. The corresponding curl profile for the photographic film of Example 9 is shown in FIG. 11.

EXAMPLE 10

Figure 12:
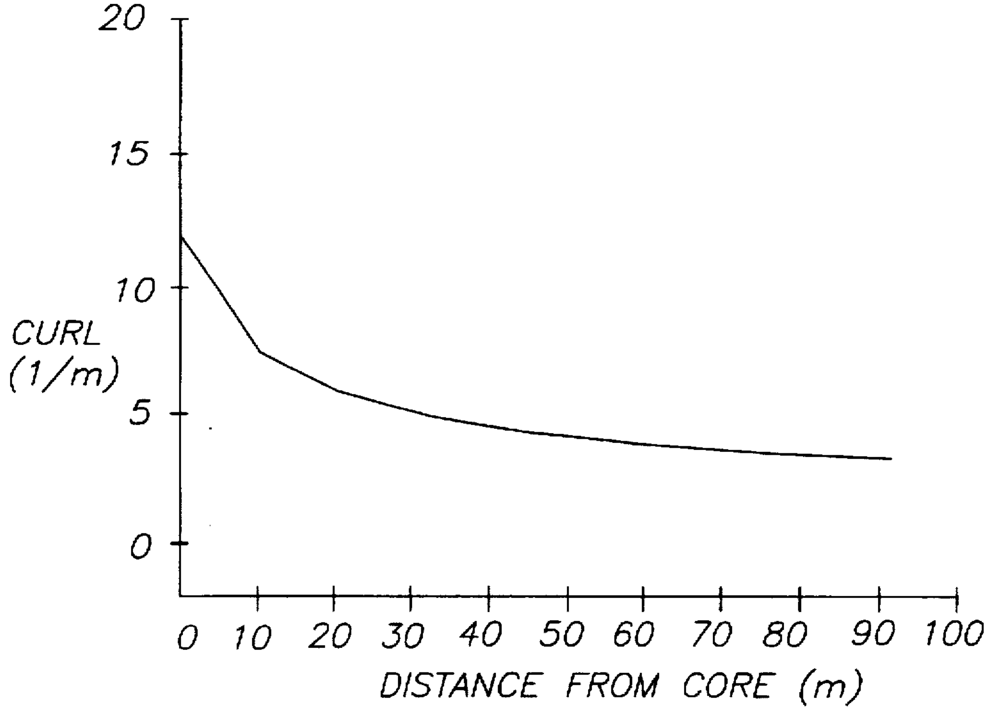
FIG. 12 is a graph showing the curl profile for the photographic film of Example 10 set forth herein plotting curl in inverse meters (1/m) versus distance (in meters) from the core.

All of the parameters of Example 9 are duplicated with the exception that the film is heated by radiant heaters 28 to a temperature of 37.5° C. (12.5° C. above the ambient temperature at which the film had been stored) prior to the second rewinding step. The corresponding curl profile for the photographic film of Example 10 is shown in FIG. 12. Comparing FIG. 12 to FIG. 11, it can be seen that some core-set curl reduction is achieved over a short period of time with the addition of the preheating step.

EXAMPLE 11

Figure 13:
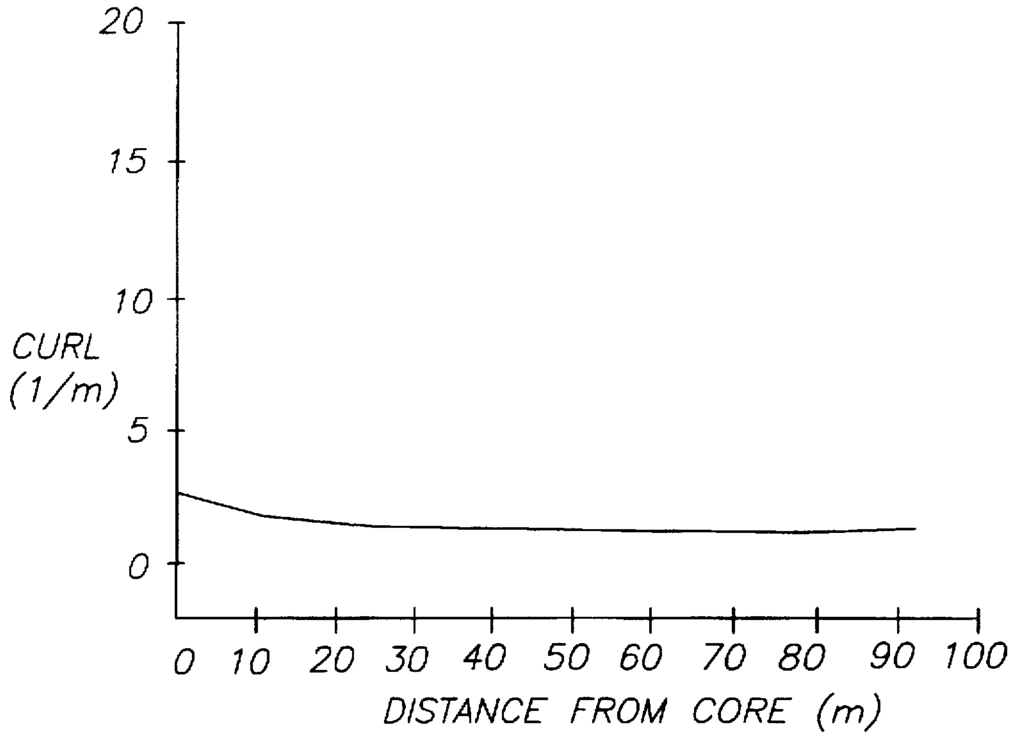
FIG. 13 is a graph showing the curl profile for the photographic film of Example 11 set forth herein plotting curl in inverse meters (1/m) versus distance (in meters) from the core.

All of the parameters of Example 10 are duplicated with the exception that the film is heated by radiant heaters 28 to a temperature of 45° C. (20° C. above the ambient temperature at which the film had been stored) prior to the second rewinding step. The corresponding curl profile for the photographic film of Example 11 is shown in FIG. 13. Comparing FIG. 13 to FIGS. 11 and 12, it can be seen that very significant core-set curl reduction is achieved over a short period of time by elevating the temperature of the preheating step.

A summary of Examples 1 through of 11 is set forth in Table 2 below. This summary identifies the temperature the traveling portion of the web 26 and the roll 24 within housing 30 are heated to as well as the highest level of curl determined for the roll of film 24 of each example.

TABLE 2

| Example | Rewinding | Temperature* (°C.) | Curl (max) (l/m) |
|---|---|---|---|
| 1 | no | — | 2.2 |
| 2 | yes | amb. | 1.88 |
| 3 | yes | 37.5 | 0.71 |
| 4 | yes | 45.0 | −0.64 |
| 5 | yes | 37.5 | 0.70 |
| 6 | yes | 45.0 | 0.86 |
| 7 | yes | 37.5 | 0.76 |
| 8 | yes | 37.5 | 0.53 |
| 9 | yes | amb. | 18.8 |
| 10 | yes | 37.5 | 11.8 |
| 11 | yes | 45.0 | 2.50 |

*film temp. of roll 24

From the foregoing examples, it will be appreciated by those skilled in the art that the diameter of the third core or mandrel 22 does have an effect on the decurling process of the present invention. The diameter of the third core or mandrel 22 should not be greater than the diameter of the first core or mandrel 12. Preferably, the diameter of the third core or mandrel 22 should be less than the diameter of the first core or mandrel 12.

It should be noted that FIG. 1 and 2 show that, in the first rewinding step of the present invention, roll 10 is rewound onto core or mandrel 14 in the same direction as the film had been originally wound on core or mandrel 12 clockwise as depicted), and then reverse rewound (counterclockwise as depicted). Although it is preferred that the film be first rewound and then reverse rewound, it is believed that the method of the present invention be practiced with like effectiveness reversing the two rewinding steps. That is, the roll 10 can first be reverse rewound onto second core or mandrel 14 and then rewound onto third core or mandrel 22.

The model presented above can be used to predict the temperature to which the traveling web portion 26 and the roll 24 must be heated in order to achieve the particularly desired level of decurling. It will be appreciated by those skilled in the art that such temperature can also be determined empirically with minimal experimentation. The examples presented above provide data as to such temperatures and the amount of decurling achieved for the specific variables of each example.

Table 3 below presents further data as to the temperature increase needed to remove curl from wound rolls of PET film stored for different periods of time at ambient temperature. For the purposes of the data presented in Table 3, it is assumed that the roll 24 is retained within housing 30 at the predetermined temperature for a period of approximately 1 hour after the completion of the second rewinding step. It is further assumed that the diameter of core or mandrel 22 is equal to the diameter of core or mandrel 12 and that curl is ultimately measured approximately 2 hours after unwinding roll 24.

TABLE 3

| Storage time at ambient temp. in days | Temp. increase above ambient |
|---|---|
| 1 | 10° C. |
| 14 | 15° C. |
| 28 | 20° C. |

The absolute upper limit for the temperature of the preheating step is the glass transition temperature ($T_g$) the polymer from which the base web is made. Heating the web to the glass transition temperature would result in permanent deformation of the film making the product unusable.

It should be appreciated that Table 3 provides estimated values of the necessary temperature increases above ambient storage temperature and that such values are specific to the conditions given. For other core diameters and/or other periods of retention within housing 30, the temperature increases will vary.

Figure 14:
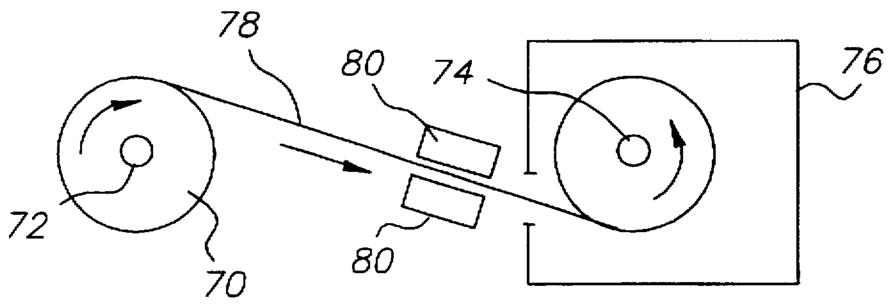
FIG. 14 is a schematic depicting an alternative embodiment of the method of the present invention for use with rolls of low footage.

The preferred embodiment of the method of the present invention as described above is suitable for decurling webs of both high and low footage. For the purposes of this application, low footage rolls contain less than 300 meters of film and high footage rolls contain at least 300 meters of film. With low footage rolls, the first rewinding step can be eliminated while still achieving the desired decurling results. In other words, with a low footage roll, the original roll 70 (see FIG. 14) from storage can be rewound from core 72 directly onto the core 74 within housing 76. Once again, there is a traveling portion 78 of the web which is preheated to a predetermined temperature by heaters 80. Means (not shown) are also provided maintain the temperature within housing 76 at that same predetermined temperature.

It will be appreciated by those skilled in the art that the method of the present invention can be practiced without the predetermined temperature of the preheating step of the traveling web portion 26, 78 being exactly equal to the predetermined temperature maintained within the housing 30, 76. Although such predetermined temperatures are preferably the same, the housing can be maintained at a temperature which is plus or minus 5° C. from predetermined temperature of the preheating step. Therefore, as used herein, the term "about the predetermined temperature" is intended to mean the predetermined temperature ±5° C.

From the foregoing, it will be seen that this invention is one well adapted to attain all of the ends and objects hereinabove set forth together with other advantages which are apparent and which are inherent to the process.

It will be understood that certain features and subcombinations are of utility and may be employed with reference to other features and subcombinations. This is contemplated by and is within the scope of the claims.

As many possible embodiments may be made of the present invention without departing from the scope thereof, it is to be understood that all matter herein set forth and shown in the accompanying drawings is to be interpreted as illustrative and not in a limiting sense.

What is claimed is:

1. A method for reducing curl in a stored photographic film wound on a first core having a first diameter, the stored photographic film having been stored at a first temperature, the stored photographic film having a glass transition temperature, said method comprising the steps of:

(a) unwinding the stored photographic film from the first core;

(b) winding the stored photographic film about a second core having a second diameter in a first direction;

(c) unwinding the stored photographic film from the second core to yield a traveling web portion;

(d) preheating the traveling web portion to a predetermined temperature above the first temperature and below the glass transition temperature;

(e) then winding the traveling web portion onto a third core in a direction opposite to the first direction, the third core having a third diameter which is not greater than the first diameter; and (f) maintaining the web wound on the third core at about the predetermined temperature for not more than two hours after completion of the second winding step.

2. A method as recited in claim 1 wherein:

the stored photographic film was stored at a known storage temperature and the predetermined temperature of the preheating step is in a range from about 10° C. to about 40° C. above the known storage temperature.

3. A method for reducing curl in a stored photographic film wound on a first core having a first diameter, said method comprising the steps of:

(a) unwinding the stored photographic film from the first core;

(b) winding the stored photographic film about a second core in a first direction;

(c) unwinding the stored photographic film from the second core to yield a traveling web portion;

(d) preheating the traveling web portion to a predetermined temperature below a glass transition temperature of the stored photographic film; and (e) then winding the traveling web portion onto a third core in a second direction opposite the first direction while the traveling web portion is at about the predetermined temperature;

(f) supporting the third core and the web wound thereon within a housing; and (g) maintaining the web wound on the third core at about the predetermined temperature for not more than two hours after completion of the second winding step.

4. A method as recited in claim 3 wherein:

the stored photographic film was stored at a known storage temperature and the predetermined temperature of the preheating step is in a range from about 5° C. to about 50° C. above the known storage temperature.

5. A method as recited in claim 3 further comprising the step of:

determining a temperature to achieve in the preheating step which will result in substantially de-curling the stored photographic film during said retaining step.

6. A method as recited in claim 3 wherein:

the stored photographic film was stored at a known storage temperature and the predetermined temperature of the preheating step is in a range from about 10° C. to about 40° C. above the known storage temperature.

7. A method for reducing curl in a stored photographic film wound on a first core having a first diameter, said method comprising the steps of:

(a) unwinding the stored photographic film from the first core;

(b) winding the stored photographic film about a second core in a first direction;

(c) unwinding the stored photographic film from the second core to yield a traveling web;

(d) preheating the traveling web to a predetermined temperature above ambient temperature and below a glass transition temperature of the stored photographic film;

(e) continuously delivering the traveling web to a housing;

(f) then continuously winding the traveling web within the housing onto a third core in a direction opposite to the first direction;

(g) maintaining the web wound on the third core at about the predetermined temperature within the housing for not more than two hours after completion of the second winding step.

8. A method as recited in claim 7 wherein:

the third core has a third diameter which is less than the first diameter.

9. A method as recited in claim 7 wherein:

the third core has a third diameter which is approximately one half of the first diameter.

10. A method as recited in claim 7 wherein:

the stored photographic film was stored at a known storage temperature and the predetermined temperature of the preheating step is in a range from about 5° C. to about 50° C. above the known storage temperature.

11. A method as recited in claim 7 wherein:

the stored photographic film was stored at a known storage temperature and the predetermined temperature of the preheating step is in a range from about 10° C. to about 40° C. above the known storage temperature.

12. A method for reducing curl in a stored photographic film wound on a first core having a first diameter, the stored photographic film having a glass transition temperature, said method comprising the steps of:

(a) unwinding the stored photographic film from the first core to yield a traveling web portion;

(b) preheating the traveling web portion to a predetermined temperature below the glass transition temperature;

(c) then winding the traveling web portion onto a second core while the traveling web portion is at about the predetermined temperature;

(d) supporting the second core and the web wound thereon within a housing during said winding step; and (e) maintaining the web wound on the second core at about the predetermined temperature for less than two hours.

13. A method as recited in claim 12 wherein:

the stored photographic film was wound in a first direction and the winding step is performed to wind the stored photographic film in a second direction which is opposite to the first direction.

14. A method as recited in claim 12 wherein:

the second core has a second diameter which is less than the first diameter.

15. A method as recited in claim 12 further comprising the step of:

retaining the web wound on the second core within the housing for a period of less than two hours.

16. A method as recited in claim 12 wherein:

the stored photographic film was stored at a known storage temperature and the predetermined temperature of the preheating step is in a range from about 5° C. to about 50° C. above the known storage temperature.

17. A method as recited in claim 12 wherein:

the stored photographic film was stored at a known storage temperature and the predetermined temperature of the preheating step is in a range from about 10° C. to about 40° C. above the known storage temperature.

* * * * *